United States Patent [19]
Wang Lee

[11] Patent Number: 5,494,615
[45] Date of Patent: Feb. 27, 1996

[54] METHOD AND APPARATUS FOR MANUFACTURING EYEGLASSES BY FORMING INTEGRALLY A FRAME UNIT ON A LENS UNIT

[76] Inventor: Min-Young Wang Lee, No. 473, Chung-Shan S. Rd., Yung-Kang Hsiang, Tainan Hsien, Taiwan

[21] Appl. No.: 314,353

[22] Filed: Sep. 28, 1994

[51] Int. Cl.$^6$ ........................... B29D 11/00
[52] U.S. Cl. ................ 264/1.7; 264/571; 264/246; 264/247; 264/275; 264/279; 425/127; 425/129.1; 425/808
[58] Field of Search ............... 351/177, 178, 351/154; 2/426; 264/1.1, 1.7, 246, 247, 102, 101, 544, 571, 275, 279; 425/808, 127, 129.1, 387.1, 388

[56] References Cited

U.S. PATENT DOCUMENTS

| | | | |
|---|---|---|---|
| 1,997,500 | 4/1935 | Swarovski | 264/571 |
| 3,247,550 | 4/1966 | Haines, Jr. | 264/571 |
| 3,406,232 | 10/1968 | Barker | 425/808 |
| 3,531,869 | 10/1970 | Hays et al. | 425/808 |
| 3,621,544 | 11/1971 | Petitto | 425/808 |
| 4,161,060 | 7/1979 | Lenne et al. | 425/808 |
| 4,170,616 | 10/1979 | Jebens | 264/102 |
| 4,383,673 | 5/1983 | Laprade et al. | 425/808 |
| 5,275,764 | 1/1994 | Hettinga | 264/1.7 |
| 5,413,743 | 5/1995 | Prophet | 264/1.7 |

FOREIGN PATENT DOCUMENTS

| | | | |
|---|---|---|---|
| 62-5841 | 1/1987 | Japan | 264/1.7 |
| 1-210334 | 8/1989 | Japan | 264/1.7 |
| 3-69910 | 3/1991 | Japan | 264/1.7 |

*Primary Examiner*—Mathieu D. Vargot
*Attorney, Agent, or Firm*—Knobbe, Martens, Olson & Bear

[57] ABSTRACT

A method for manufacturing eyeglasses includes the steps of: forming a lens unit; providing a mold unit which includes first and second mold halves, the first mold half having a support surface which conforms to a rear surface of the lens unit and a first frame defining surface which extends around a portion of the support surface, the second mold half having a complementary surface which conforms to a front surface of the lens unit and which defines a lens receiving space with the support surface, and a second frame defining surface which extends around a portion of the complementary surface and which defines a frame forming cavity with the first frame defining surface, the first mold half being formed with an air passage having a first open end which opens at the support surface; placing the lens unit fittingly in the lens receiving space such that a first positioning unit formed on the rear surface engages a second positioning unit formed on the support surface; activating a vacuum pump connected operably to a second end of the air passage to draw air out of the air passage when the lens unit is received in the lens receiving space; and feeding a measured quantity of molten material into the frame forming cavity via a material flow passage formed in the first mold half to form integrally the frame unit on a periphery of the lens unit.

3 Claims, 5 Drawing Sheets

METHOD AND APPARATUS FOR MANUFACTURING EYEGLASSES BY FORMING INTEGRALLY A FRAME UNIT ON A LENS UNIT

BACKGROUND OF THE INVENTION

1. Field of the Invention

This invention relates to a method for manufacturing eyeglasses, more particularly to a method for manufacturing eyeglasses by forming integrally a frame unit on a lens unit and an apparatus therefor.

2. Description of the Related Art

The following are two different conventional methods for manufacturing eyeglasses:

1. The first conventional manufacturing method includes the step of forming a frame unit by injection molding and the step of forming and mounting a lens unit on the frame unit by engaging a peripheral edge of the lens unit within a groove formed in an inner peripheral wall of the frame unit. Since the frame unit and the lens unit are formed separately, accidental removal of the lens unit from the frame unit easily occurs. Furthermore, aside from the steps of forming the lens unit and the frame unit, an additional step of mounting the lens unit on the frame unit is required, thereby inconveniencing the manufacture of the eyeglasses.

2. The second conventional manufacturing method is capable of overcoming the aforementioned problem associated with the first conventional manufacturing method and includes the step of forming integrally a frame unit and a lens unit. FIG. 1 shows a frame unit 12 formed integrally on a periphery of a lens unit 11. The frame unit 12 has two opposite end portions 121 at two opposite sides of the lens unit 11. A temple (not shown) is connected pivotally and respectively to each of the opposite end portions 121. While the second conventional manufacturing method is able to solve the problem associated with the first conventional manufacturing method, the resulting product lacks aesthetic appeal. This is due to the fact that the frame and lens unit 12, 11 cannot have different colors because they are formed at the same time.

SUMMARY OF THE INVENTION

Therefore, the main objective of the present invention is to provide a method for manufacturing eyeglasses by forming integrally a frame unit on a lens unit and an apparatus therefor, which method being capable of overcoming the aforementioned problems associated with the prior art.

According to the present invention, a method for manufacturing eyeglasses includes the steps of: forming a lens unit, the lens unit having front and rear surfaces, a periphery interconnecting the front and rear surfaces, and a first positioning unit on the rear surface; providing a mold unit which includes first and second mold halves, the first mold half having a support surface which conforms to the rear surface of the lens unit and a first frame defining surface which extends around at least a portion of the support surface, the second mold half having a complementary surface which conforms to the front surface of the lens unit and a second frame defining surface which extends around at least a portion of the complementary surface, the support surface and the complementary surface cooperatively defining a lens receiving space therebetween, the first and second frame defining surfaces cooperatively defining a frame forming cavity therebetween, the first mold half being formed with an air passage with a first open end which opens at the support surface and a second end, at least one of the first and second mold halves being formed with a material flow passage for feeding molten material into the frame forming cavity; placing the lens unit fittingly in the lens receiving space such that the first positioning unit engages a second positioning unit formed on the support surface so as to prevent movement of the lens unit relative to the support surface, one of the first and second positioning units being a projection, the other one of the first and second positioning units being a recess; activating a vacuum pump connected operably to the second end of the air passage to draw air out of the air passage when the lens unit is received fittingly in the lens receiving space so as to position firmly the lens unit on the support surface; and feeding a measured quantity of molten material into the frame forming cavity of the mold unit via the material flow passage so as to form integrally the frame unit on the periphery of the lens unit.

BRIEF DESCRIPTION OF THE DRAWINGS

Other features and advantages of the present invention will become apparent in the following detailed description of the preferred embodiment, with reference to the accompanying drawings, of which.

DETAILED DESCRIPTION OF THE PREFERRED EMBODIMENT

Figure 1:
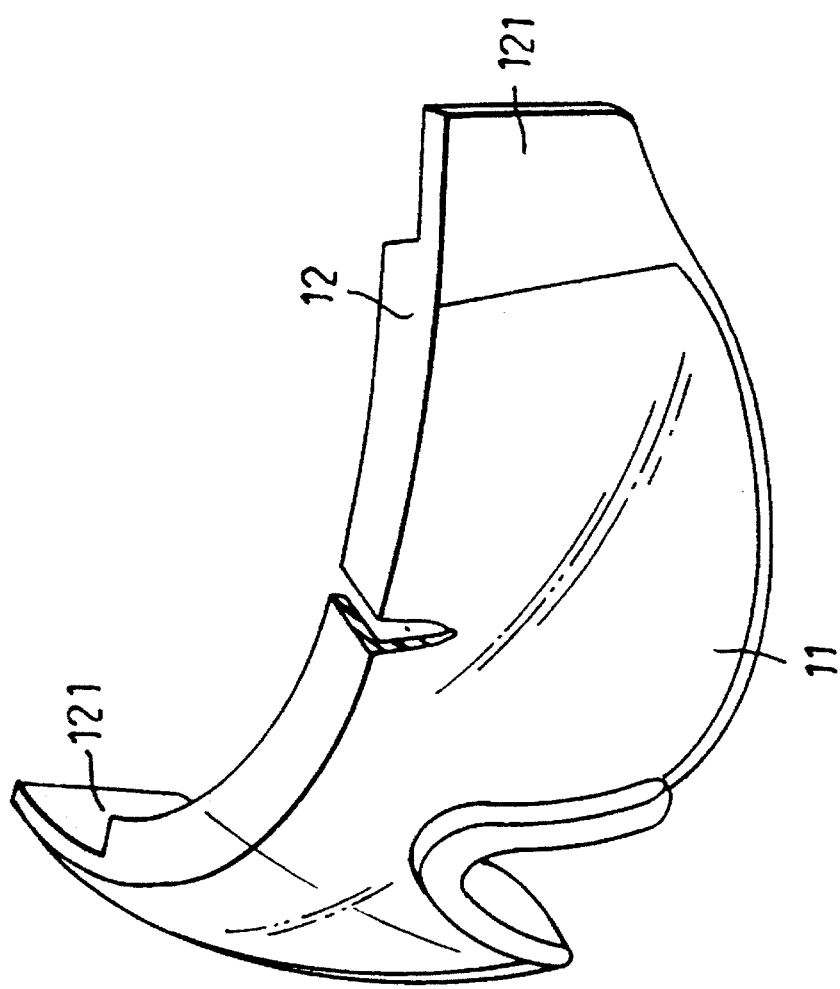
FIG. 1 is a schematic perspective view of an assembly of a frame unit and a lens unit, the frame unit being formed integrally on the lens unit by a conventional manufacturing method.
Figure 2:
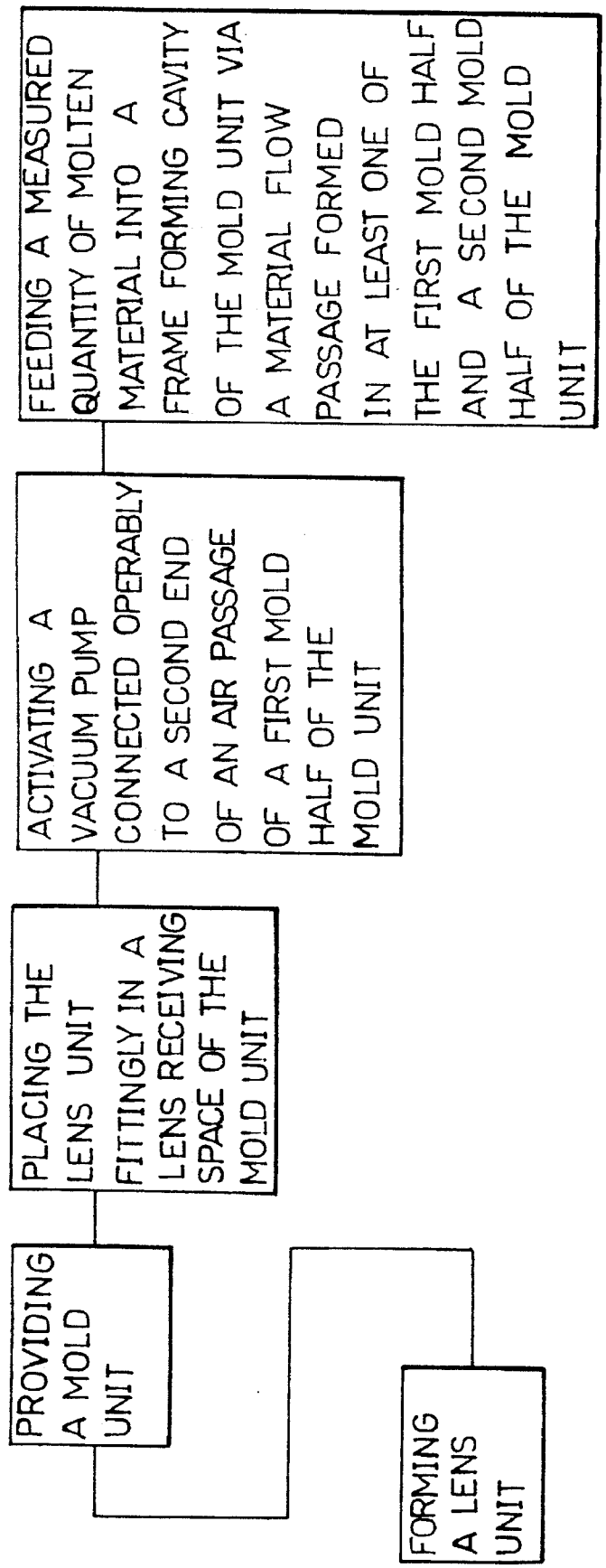
FIG. 2 is a flow diagram illustrating the steps of the method for manufacturing eyeglasses in accordance with the present invention.
Figure 3:
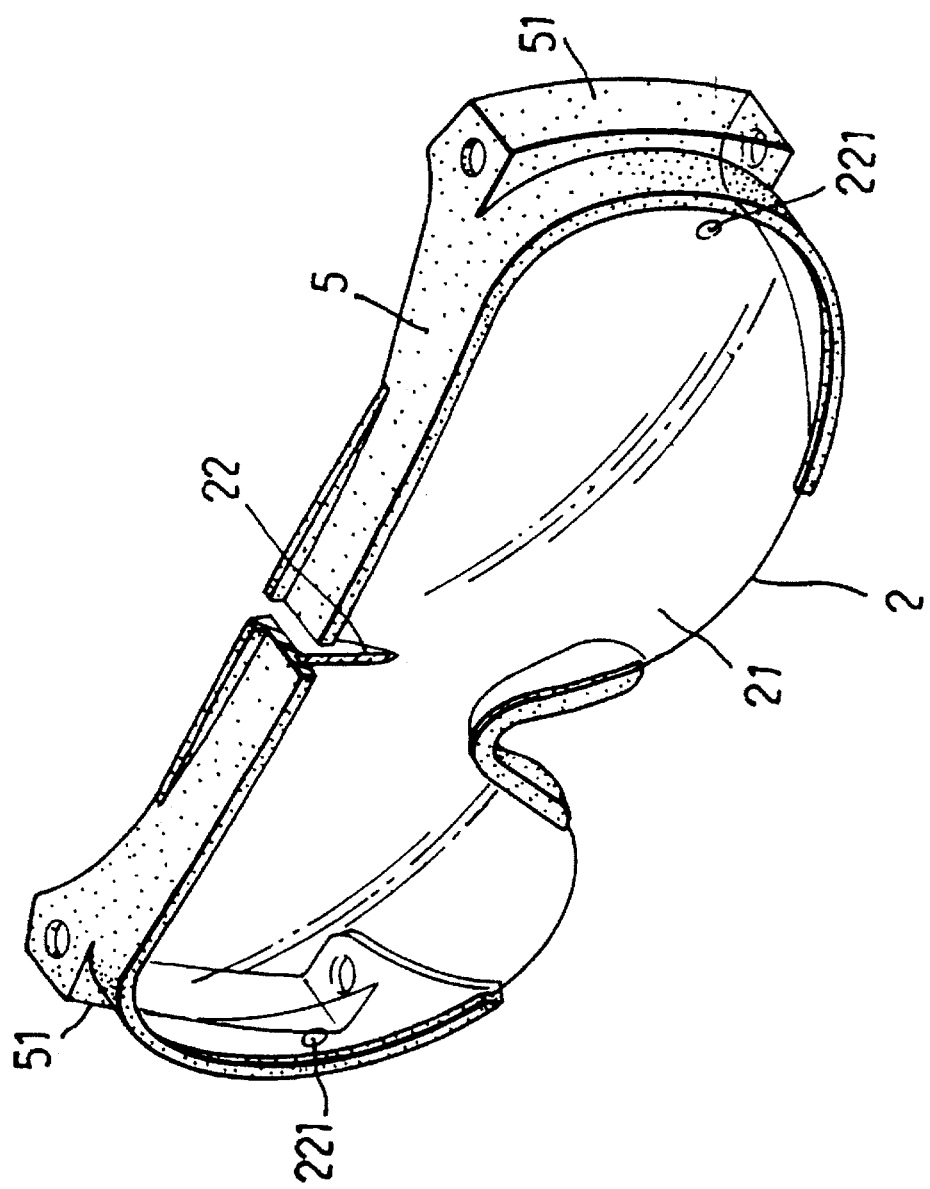
FIG. 3 is a schematic perspective view of a pair of eyeglasses manufactured by the method in accordance with the present invention.
Figure 4:
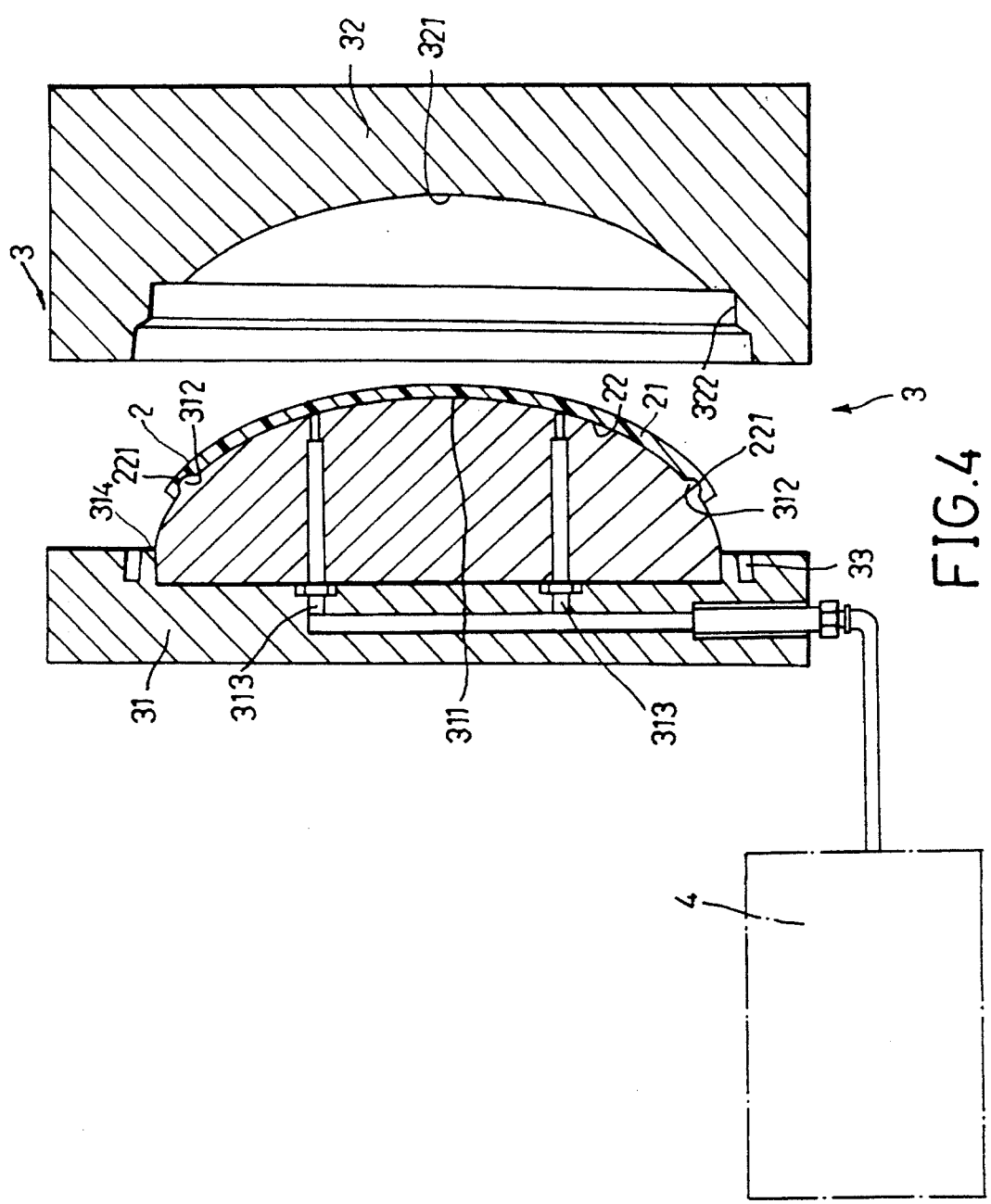
FIG. 4 is a schematic sectional view illustrating an apparatus for forming integrally a frame unit on a lens unit, wherein a mold unit of the apparatus is opened.
Figure 5:
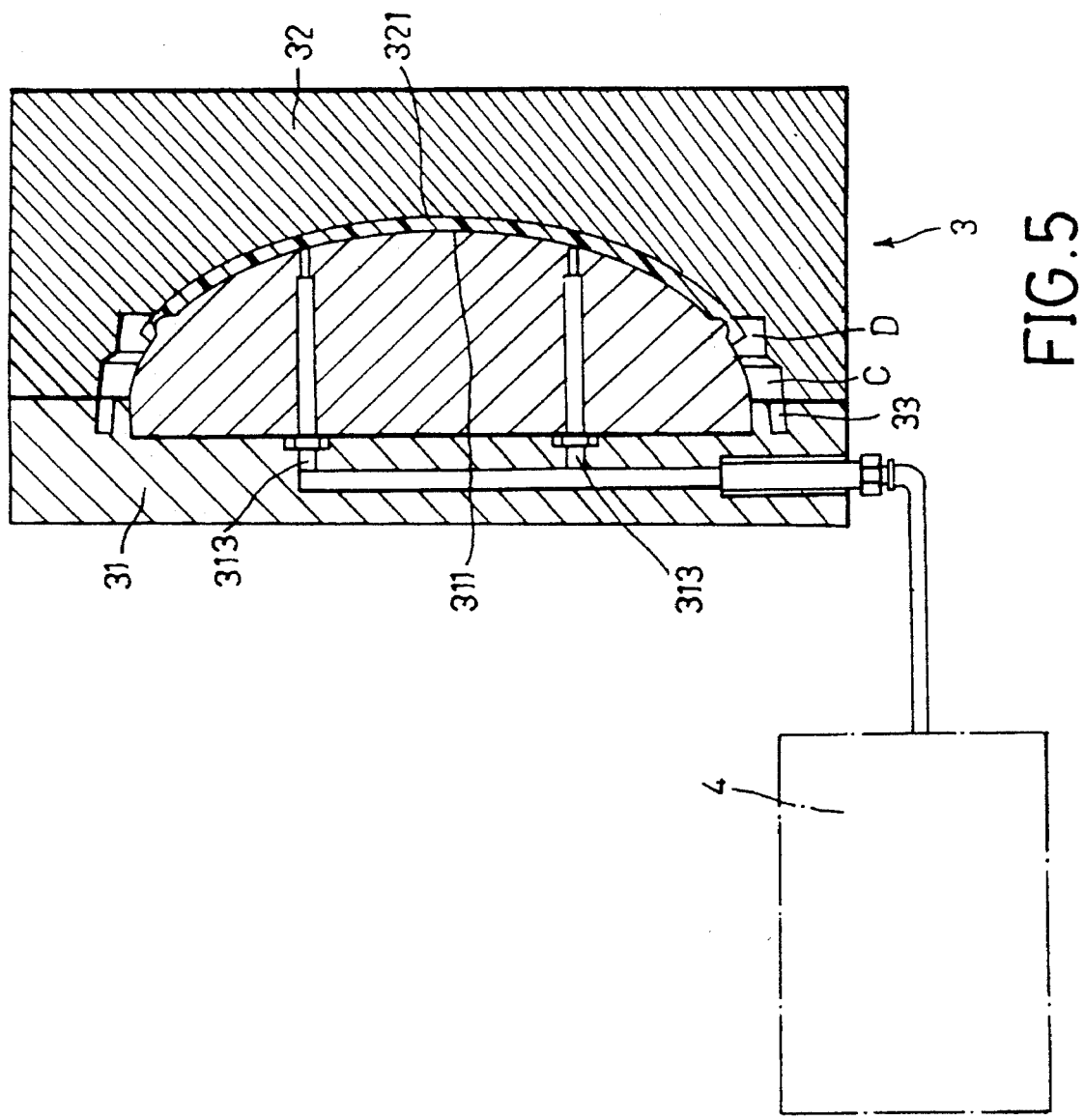
FIG. 5 is a schematic sectional view similar to FIG. 4, wherein the mold unit is closed.

FIG. 3 is a schematic perspective view of a pair of eyeglasses that is manufactured by the method according to the present invention. The eyeglasses includes a frame unit 5 which is formed integrally on a lens unit 2. Referring now to FIGS. 2 to 5, the lens unit 2 is formed initially by using conventional injection molding techniques or conventional cutting processes. The lens unit 2 has front and rear surfaces 21 and 22, a periphery interconnecting the front and rear surfaces 21 and 22, and a first positioning unit on the rear surface 22. In the present embodiment, the first positioning unit is a recess 221 formed on each of two sides of the rear surface 22 of the lens unit 2.

A mold unit 3 includes first and second mold halves 31, 32. The first mold half has a support surface 311 which conforms to the rear surface 22 of the lens unit 2 and which is formed with a second positioning unit and a first frame defining surface 314 which extends around at least a portion of the support surface 311. In the present embodiment, the second positioning unit is a projection 312 formed on each of two sides of the support surface 311. The first mold half 31 is formed with two air passages 313 and two material flow passages 33. Each of the air passages 313 has a first open end which opens at the support surface 311 and a second end. The second mold half 32 has a complementary surface 321 which conforms to the front surface 21 of the lens unit 2 and a second frame defining surface 322 which extends around at least a portion of the complementary surface 321. The support surface 311 and the complementary surface 321 cooperatively define a lens receiving space (S) therebetween for receiving fittingly the lens unit 2 therein. The recesses 221 engage the respective projection 312 so as to prevent the movement of the lens unit 2 relative to the support surface 311. It should be noted that the recesses 221 may be formed on the support surface 311, while the projections 312 may be formed on the rear surface 22 of the lens unit 2. The first and second frame defining surfaces 314, 322 cooperatively define a frame forming cavity (C) therebetween.

A vacuum pump 4 is connected operably to the second ends of the air passages 313 and is activable to draw air out of the air passages 313 when the lens unit 2 is received fittingly in the lens receiving space (S) so as to position firmly the lens unit 2 on the support surface 311.

The frame unit 5 is formed integrally on the periphery of the lens unit 2 when a measured quantity of molten material is fed into the frame forming cavity (C) of the mold unit 3 via the material flow passages 33. The frame unit 5 has two opposite portions 51 which extend respectively from opposite sides of the lens unit 2. A temple (not shown) is connected pivotally and respectively to each of the opposite portions 51.

Accordingly, the method of the present invention has the following advantages:

1. The lens unit 2 is firmly positioned on the support surface 311 by the use of the vacuum pump 4, thereby forming precisely integrally the frame unit 5 on the lens unit 2.

2. Since the frame unit 5 is formed integrally on the lens unit 2, disengagement of the lens unit 2 from the frame unit 5 can be avoided.

3. The color of the frame unit 5 may be different from that of the lens unit 2 since the lens unit 2 and the frame unit 5 are formed separately. For example, a colorless plastic material may be used to form the lens unit 2, while a plastic material of hawksbill-like color may be used to form the frame unit 5. It should be noted that the material for forming the lens unit 2 and the material for forming the frame unit 5 should have the same or similar characteristics so as to prevent the occurrence of an undesired chemical reaction when forming the frame unit 5 on the lens unit 2.

While the present invention has been described in connection with what is considered the most practical and preferred embodiment, it is understood that this invention is not limited to the disclosed embodiment, but is intended to cover various arrangements included within the spirit and scope of the broadest interpretation so as to encompass all such modifications and equivalent arrangements.

I claim:

1. A method for manufacturing eyeglasses, comprising the steps of:

(i) forming a lens unit, said lens unit having front and rear surfaces, a periphery interconnecting said front and rear surfaces, and a first positioning unit on said rear surface;

(ii) providing a mold unit which includes first and second mold halves, said first mold half having a support surface which conforms to said rear surface of said lens unit and a first frame defining surface which extends around at least a portion of said support surface, said second mold half having a complementary surface which conforms to said front surface of said lens unit and a second frame defining surface which extends around at least a portion of said complementary surface, said support surface and said complementary surface cooperatively defining a lens receiving space therebetween, said first and second frame defining surfaces cooperatively defining a frame forming cavity therebetween, said first mold half being formed with an air passage with a first open end which opens at said support surface and a second end, at least one of said first and second mold halves being formed with a material flow passage for feeding molten material into said frame forming cavity;

(iii) placing said lens unit fittingly in said lens receiving space such that said first positioning unit engages a second positioning unit formed on said support surface so as to prevent movement of said lens unit relative to said support surface, one of said first and second positioning units being a projection, the other one of said first and second positioning units being a recess;

(iv) activating a vacuum pump connected operably to said second end of said air passage to draw air out of said air passage when said lens unit is received fittingly in said lens receiving space so as to position firmly said lens unit on said support surface; and (v) feeding a measured quantity of molten material into said frame forming cavity of said mold unit via said material flow passage so as to form integrally said frame unit on said periphery of said lens unit.

2. A method for forming integrally a frame unit on a lens unit, said lens unit having front and rear surfaces, a periphery interconnecting said front and rear surfaces, and a first positioning unit on said rear surface, said method comprising the steps of:

(a) providing a mold unit which includes first and second mold halves, said first mold half having a support surface which conforms to said rear surface of said lens unit and a first frame defining surface which extends around at least a portion of said support surface, said second mold half having a complementary surface which conforms to said front surface of said lens unit and a second frame defining surface which extends around at least a portion of said complementary surface, said support surface and said complementary surface cooperatively defining a lens receiving space therebetween, said first and second frame defining surfaces cooperatively defining a frame forming cavity therebetween, said first mold half being formed with an air passage with a first open end which opens at said support surface and a second end, at least one of said first and second mold halves being formed with a material flow passage for feeding molten material into said frame forming cavity;

(b) placing said lens unit fittingly in said lens receiving space such that said first positioning unit engages a second positioning unit formed on said support surface so as to prevent movement of said lens unit relative to said support surface, one of said first and second positioning units being a projection, the other one of said first and second positioning units being a recess;

(c) activating a vacuum pump connected operably to said second end of said air passage to draw air out of said air passage when said lens unit is received fittingly in said lens receiving space so as to position firmly said lens unit on said support surface; and
(d) feeding a measured quantity of molten material into said frame forming cavity of said mold unit via said material flow passage so as to form integrally said frame unit on said periphery of said lens unit.

3. An apparatus for forming integrally a frame unit on a lens unit, said lens unit having front and rear surfaces, a periphery interconnecting said front and rear surfaces, and a first positioning unit on said rear surface, said apparatus comprising:

a mold unit including first and second mold halves, said first mold half having a support surface which conforms to said rear surface of said lens unit and a first frame defining surface which extends around at least a portion of said support surface, said second mold half having a complementary surface which conforms to said front surface of said lens unit and a second frame defining surface which extends around at least a portion of said complementary surface, said support surface and said complementary surface cooperatively defining a lens receiving space therebetween for receiving fittingly said lens unit therein, said first and second frame defining surfaces cooperatively defining a frame forming cavity around at least a portion of said periphery of said lens unit, said support surface being formed with a second positioning unit for engaging said first positioning unit when said lens unit is received fittingly in said lens receiving space so as to prevent movement of said lens unit relative to said support surface, one of said first and second positioning units being a projection, the other one of said first and second positioning units being a recess, said first mold half being formed with an air passage with a first open end which opens at said support surface and a second end, at least one of said first and second mold halves being formed with a material flow passage for feeding molten material into said frame forming cavity; and a vacuum pump means connected operably to said second end of said air passage and activable to draw air out of said air passage when said lens unit is received fittingly in said lens receiving space to position firmly said lens unit on said support surface;

whereby, said frame unit is formed integrally on said periphery of said lens unit when a measured quantity of said molten material is fed into said frame forming cavity of said mold unit via said material flow passage.

* * * * *